United States Patent [19] [11] 3,769,594
Wawra et al. [45] Oct. 30, 1973

[54] PEAK VALUE MEASURING AND REGULATING CIRCUIT

[75] Inventors: Carl-Martin Wawra, Bensheim-Auerbach; Ivan Chudey, Ober-Ramstadt, both of Germany

[73] Assignee: Carl Schenek Maschinenfabrik GmbH, Darmstadt, Germany

[22] Filed: Mar. 27, 1972

[21] Appl. No.: 238,431

[52] U.S. Cl. ............................. 328/151, 307/235 A
[51] Int. Cl. ............................................. H03k 5/00
[58] Field of Search ................. 328/151; 307/235 A; 324/103 P; 73/88.5

[56] References Cited
UNITED STATES PATENTS
3,049,380  7/1962  Brennan.......................... 328/151 X
3,116,458  12/1963  Margopoulos.................. 328/151 X Primary Examiner—John Zazworsky
Attorney—W. G. Fasse

[57] ABSTRACT

The present peak value measuring and regulating circuit arrangement includes at least one maximum signal memory and one minimum signal memory for storing oscillation representing signals for a constant length of storage time ($t1$) during which logic circuit means controlled by the upper signal value or by the lower signal value actuate a timer which closes signal path means to supply either differential signals or actual signals representing certain load conditions to evaluating and regulating means for an evaluating time duration ($\Delta t$) which is independent of the frequency of said oscillation. At the end of the storage time ($t1$) the timer erases the stored information.

4 Claims, 3 Drawing Figures

PEAK VALUE MEASURING AND REGULATING CIRCUIT

BACKGROUND OF THE INVENTION

The present invention relates to a peak value measuring and regulating circuit arrangement, more specifically, to a circuit arrangement for ascertaining the maximum and minimum values of an oscillation represented by an electrical signal to be regulated. For this purpose peak value voltage storage means are provided. The present circuit arrangement is especially suitable for use in connection with a peak value computer in a dynamic testing machine and for controlling or regulating such testing machine.

In one prior art peak value computer circuit means are provided for forming an enveloping function for the maximum values and another enveloping function for the minimum values. These enveloping functions are formed from the oscillation which is present in the form of an electrical signal voltage. Two peak value memory or storage means are provided for the formation of each enveloping function. These memories store alternately a maximum and a minimum value which values are supplied to the output of the circuit arrangement by means of logic circuits comprising comparators, flip-flops, AND-gates as well as OR-gates.

The known circuit arrangement is relatively involved and accordingly expensive. Moreover the amplifiers in the two peak voltage memories have different drifts due to which a certain inexactness in the measured results cannot be avoided.

OBJECTS OF THE INVENTION

In view of the foregoing it is the aim of the invention to achieve the following objects singly or in combination:

to avoid the drawbacks of the prior art, especially to reduce the number of circuit elements;

to avoid the formation of an envelop function; and to indirectly measure the actual peak or extreme values. Extreme values are intended to include peak values in the positive and negative sense, that is, they include maximum as well as minimum peak values.

SUMMARY OF THE INVENTION

The above objects have been achieved according to the invention in a circuit arrangement comprising peak voltage storage means, especially for peak value computers in a dynamic testing machine, wherein two actual extreme values such as an actual extreme oscillation amplitude value and an actual extreme mean force value, are stored for a constant storage time ($t1$) which corresponds to one half cycle duration at the most, wherein during said storage time said actual extreme values are supplied, after the occurrence of an extreme value, to respective evaluating means for a constant evaluation time ($\Delta t$) which cannot be influenced by the frequency of said oscillation, and wherein said storage means are erased after the expiration of said storage time.

According to an especially advantageous feature of the invention, regulating circuit means are provided in which the actual extreme values are compared with rated extreme values and wherein the resulting differential values are supplied to evaluating circuit means.

As compared to the above mentioned prior art circuit arrangement, the circuit arrangement according to the invention requires practically only one half of the storage means required by the known circuit. Another advantage of the circuit arrangement according to the invention is seen in that a higher accuracy is achieved according to the invention than by the known circuit arrangement due to the comparison of the extreme actual values with the rated extreme values and due to the further use of the difference values for regulating purposes.

The circuit arrangement according to the invention comprises a timer for producing the pulse for supplying the actual extreme values or the difference values to an evaluating means and for producing the pulse for erasing the peak voltage storage means. Advantageously, such timer is triggered by logic circuit means subsequent to a maximum or a minimum. These logic circuit means comprise trigger stages connected through an AND-gate with a flip-flop which controls the generation of the time or trigger signal.

BRIEF FIGURE DESCRIPTION

In order that the invention may be clearly understood, it will now be described, by way of example, with reference to the accompanying drawings, wherein.

DETAILED DESCRIPTION OF AN EXAMPLE EMBODIMENT

Figure 1:
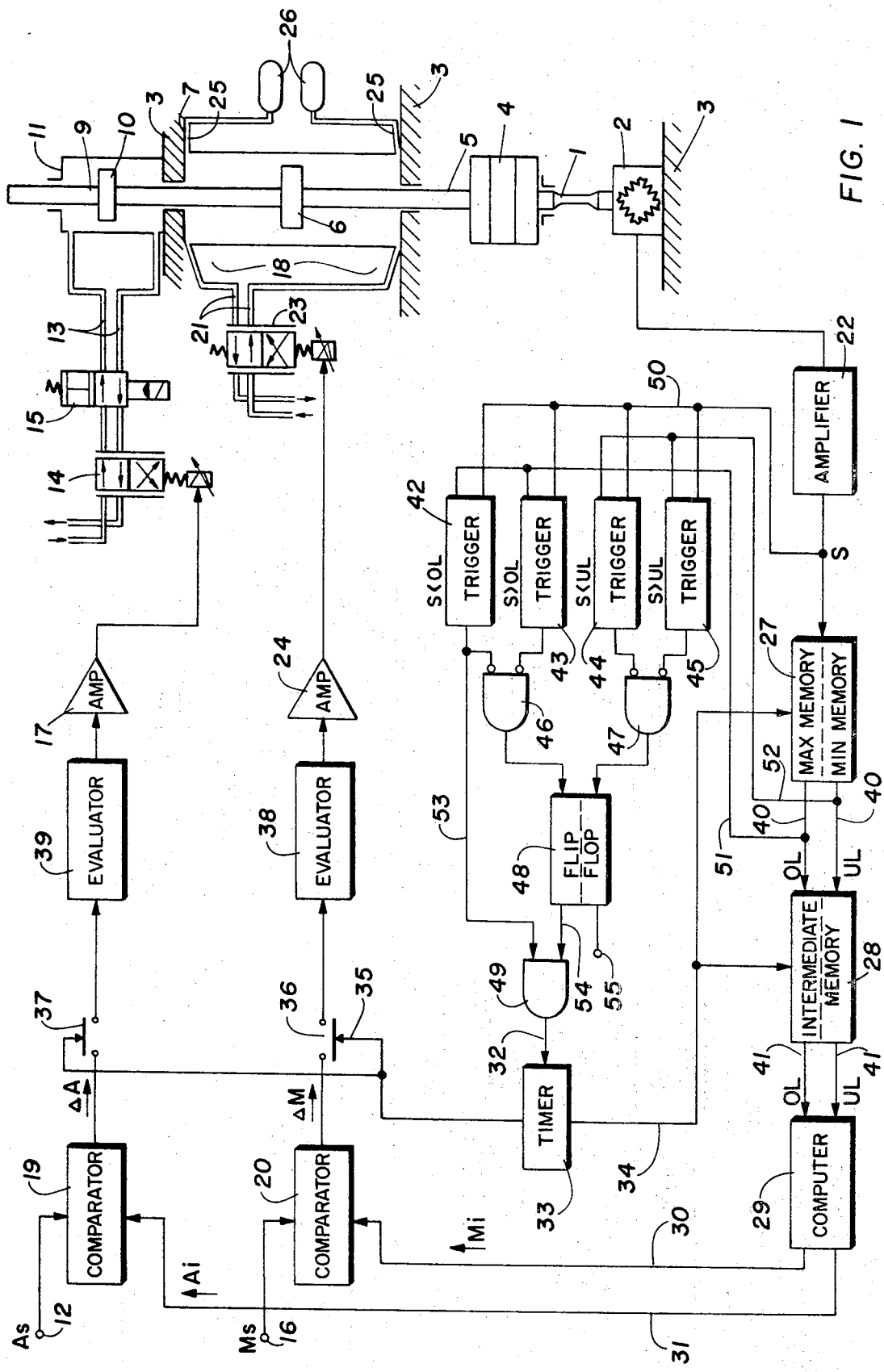
FIG. 1 illustrates a block circuit diagram of a circuit arrangement according to the invention for measuring and regulating the extreme values in a dynamic material testing apparatus.

FIG. 1 shows a material testing apparatus for producing dynamic loads applied to a test sample 1 which is arranged between a frame structure 3 and a mass 4 whereby a force measuring gauge 2 known as such is located between the test sample 1 and the frame structure 3. The mass 4 is arranged opposite the force measuring gauge 2. The mass is connected to the piston rod 5 of the piston 6 located in a so called mean force or pre-load cylinder 7. The piston 6 may be subjected to hydraulic pressure on one or the other of its surfaces. The piston rod 5 is connected with the further piston rod 9 of the piston 10 located in an oscillating or alternating load cylinder 11. If necessary, it is possible to arrange between the piston rod 5 and the piston rod 9 an intermediate transmitting element. The cylinders 7 and 11 are also secured to the frame structure 3.

A hydraulic pressure source (not shown) supplies the cylinder 11 with hydraulic pressure through the hydraulic conduits 13 in which there is arranged a hydraulic servo valve 14 and a hydraulic switching or control valve 15 whereby the supply of pressure medium is accomplished in such a manner that the piston 10 is alternately subjected to pressure on its upper side and on its lower side. Thus, a predetermined oscillating load is applied to the test sample 1.

A programming device (not shown) supplies to an input terminal 12 an amplitude rated value As. This value is compared in a comparator 19 with the actual amplitude value Ai which is supplied to the comparator 19 through the conductor 31. The value Ai as pointed out in Deutsche Industrie Normen 50100, January, 1953, is equal to one half of the difference between the maximum and minimum values of the oscillation. The resulting difference value ΔA is supplied to an evaluating means 39, such as a memory, through a switching means 37. According to the invention, the difference value ΔA may pass to the evaluating means 39 only during a predetermined time interval Δt as controlled by a timing device 33. The timing device 33, as will be apparent from the following disclosure, may be a monostable multivibrator.

Incidentally, the switch 37 which is shown, for simplicity's sake, as a mechanical switching member will preferably comprise electronic switching means. This applies also to the switch 36 to be described below. Electronic switching means capable of handling the short switching times here involved are well known in the art.

The pulse produced by the timing device 33 for closing the signal path is independent of the frequency of the respective oscillation so that the evaluation time Δt during which the signal path is closed is also independent of the frequency. Accordingly, a signal independent of the oscillation frequency is supplied to the evaluating means 39 for regulating the hydraulic cylinder 11. If desired, an amplifier 17 may be connected between the solenoid of the servo valve 14 and the output of the evaluating means 39.

A pre-load or mean force may be super-imposed over the dynamic load produced by the cylinder 11. Incidentally, the dynamic load oscillates about a zero point or value. In order to super-impose said mean load onto the dynamic load, the piston 6 of the pre-load cylinder 7 is subjected on one of its two surfaces with hydraulic liquid establishing a predetermined constant pressure or a relatively slowly varying pressure. For this purpose the cylinder 7 is provided at its ends with inflow and outflow openings 18 for the hydraulic fluid or liquid. These openings 18 are connected to the source of hydraulic pressure by hydraulic conduits 21 and a hydraulic servo valve 23. The hydraulic servo valve 23 is controlled or regulated by the amplifier 24 in such a manner that the desired mean force or load is established.

The programming device (not shown) supplies the rated mean load value Ms to an input terminal 16 of a comparator 20. The mean load or force value Ms is compared in the comparator 20 with a mean force actual value Mi which is supplied to the comparator 20 through the conductor 30. The value Mi as further pointed out in the above noted Deutsche Industrie Normen 50100, is equal to one half of the sum of the maximum and minimum values of the oscillation. A difference value ΔM which may occur is supplied to an evaluating device 38 when the switch 36 is closed. As mentioned above, the switch 36 is closed by the timing device 33 through the conductor 35 whereby it should be noted that the switch 36 will generally be an electronic switch. The evaluating device 38 which may also be a memory device, supplies a regulating or control signal preferably through an amplifier 24 to the solenoid of the servo valve 23.

Since the piston 6 performs rapid oscillating movements in response to the dynamic load cylinder 11, the cylinder volume on both sides of the piston 6 is rapidly changed during each oscillating movement. It is not possible to accommodate such a rapid equalization of the hydraulic liquid through the conduits 21. Therefore, hydraulic storage means 26 are connected to respective ports 25 at the ends of the cylinder 6. These hydraulic storage means 26 take up the volume of the hydraulic fluid which is temporarily displaced by the oscillating movements of the piston 6. The force measuring gauge 2 which produces as indicated by means of stress measuring strips a resistance variation proportional to the force, is connected to a measuring amplifier 22 which in turn produces at its output a signal voltage S proportional to the force. The output of the measuring amplifier 22 is connected to a maximum and minimum voltage memory 27. This memory 27 comprises two separate storage devices, one for the upper load; namely, the maximum amplitude and one for the lower load; namely, the minimum load amplitude. The ascertained measuring values for the upper and lower load are supplied to an intermediate memory 28 through the conductors 40 connecting the output of the memory 27 to the input of the memory 28. The intermediate memory 28 is connected to a computer 29 through conductors 41. The computer 29 calculates from the upper and lower load the actual mean force value Mi as well as the actual amplitude value Ai. The computer 29 may thus comprise a pair of conventional operational amplifier circuits connected to produce the outputs $Ai = OL-UL,/2$ and $Mi = OL+UL./2$ These values Mi and Ai are supplied to the respective comparators 19 and 20 through the conduits 31 and 30 respectively.

The signal voltage S appearing at the output of the measuring amplifier 22 is supplied to trigger stages 42 to 45 by means of the conductor 50. Further, the signal OL representing the upper load and occurring at one output of the peak voltage storage means 27 is supplied through the conductor 51 to the trigger stages 42 and 43. The signal UL representing the lower load is supplied through the conductor 52 to the trigger stages 44 and 45. The trigger stage 42 is so adjusted that it produces a signal at its output when the signal voltage S is smaller than the signal OL representing the upper load. The trigger stage 43 on the other hand is so adjusted that it produces an output signal when the signal voltage S is larger than the signal OL representing the upper load. The trigger stage 44 is adjusted so that it produces an output signal when the signal voltage S is smaller than the signal UL representing the lower load. The trigger stage 45 is so adjusted that it produces an output signal when the signal voltage S is larger than the signal UL representing the lower load. The output terminals of the upper load trigger stages 42, 43 are connected to the two inputs of a negating AND-gate 46. In the same manner, the output terminals of the lower load trigger stages 44 and 45 are connected to the inputs of a further negating AND-gate 47. The output terminals of the AND-gates 46 and 47 are connected to the two inputs of a flip-flop stage 48.

The just described logic circuit arrangement operates as follows. The negating AND-gate 46 can provide a voltage at its output only if zero potential is applied to both of its negating input stages. This is the case when the signal voltage S corresponds to the upper load signal OL appearing at the output of the peak voltage storage or memory 27. In this instance a voltage is applied to the upper input of the flip-flop 48 and a signal occurs at the output 54 of the flip-flop 48. As soon as the signal voltage S becomes smaller than the upper load signal OL stored in the peak voltage memory 27, the trigger stage 42 flips and applies a voltage to its output. This signal at the output of the trigger stage 42 is thus supplied through the conductor 53 to the AND-gate 49. As a result, both input conductors 53 and 54 supply an input signal to the AND-gate 49 whereby the AND-gate supplies a trigger signal to the timer 33 through the conductor 32. Thus, the timer 33 is switched on.

As soon as the signal voltage S corresponds to the lower load signal UL no voltage or signal is present at the outputs of the trigger stages 44 and 45. As a result the negating AND-gate 47 responds to this condition due to its two negating input stages whereby a signal is supplied to the lower input of the flip-flop stage 48 which now removes the signal or voltage from its output 54 and applies an output signal to the output conductor 55. If the trigger stage 42 now should switch, no pulse will be supplied for the triggering of the timer 33. The just described logic circuit arrangement assures that the timer 33 is triggered after the occurrence of a maximum. However, it is possible to also trigger a timer after the occurrence of a minimum. For this purpose the output of the trigger stage 45 and the output 55 of the flip-flop 48 would be connected to an AND-gate similar to AND-gate 49 which would be connected with its output to such minimum responsive timer.

The timer 33 supplies, after a short duration of time, a pulse having the duration $\Delta t$ through the conductor 35 to the switches 36 and 37. As a result, the comparators 19 and 20 are connected to the respective regulating means 39 and 38 during the time $\Delta t$ which time $\Delta t$ is independent of the respective or instantaneous load frequency. The timer 33 is further connected through a conductor 34 to erasing inputs of the memories 27 and 28 whereby the content of these memories may be erased by the timer 33 after the completion of the signal path by the switches 36 and 37. The duration of the storage time, that is, the time during which signals are stored in the memories 27 and 28 is $t1$ and corresponds to about one-fourth to one-half of the cycle duration of the highest frequency. Usually, the duration of $t1$ will correspond to about three-quarters of the cycle duration of the highest frequency. Thus, it is assured that the memories 27 and 28 are again ready for storing when the next minimum is reached, whereby said next minimum is stored until it has been computed and passed on to the evaluating or regulating means.

Figure 2:
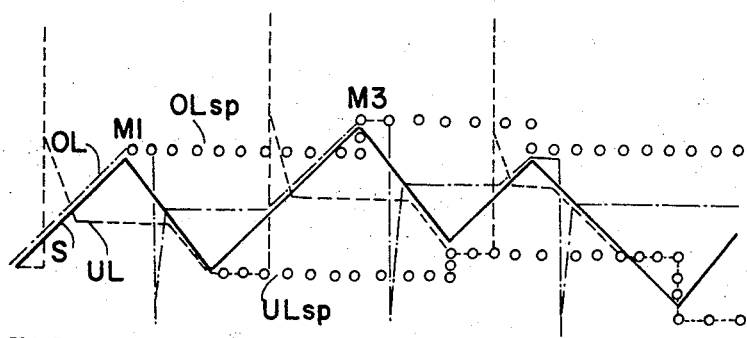
FIG. 2 illustrates a wave form diagram for explaining the operation of the circuit arrangement according to FIG. 1 when an intermediate storage or memory is employed.
Figure 3:
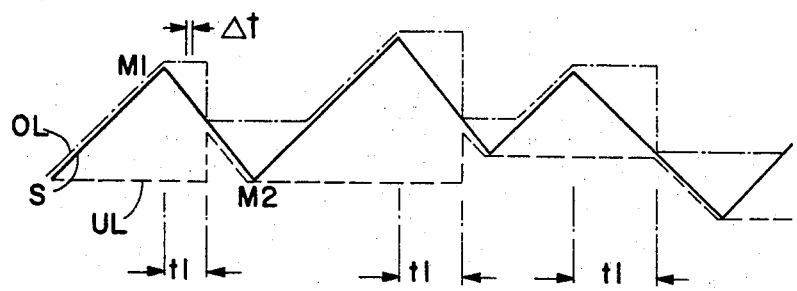
FIG. 3 is a wave form diagram similar to that of FIG. 2 but illustrating the operation without the use of an intermediate memory.

FIGS. 2 and 3 illustrate the wave form of a testing oscillation as it may occur in a dynamic testing apparatus. A triangular oscillating wave form has been selected, for example. However, quite frequently, the load oscillation may also have a sinusoidal wave form.

At the beginning of the oscillation the upper load OL follows the signal voltage S. When the maximum M1 is reached the upper load OL is stored in the peak voltage storage or memory 27 as well as in the intermediate storage or memory 28 in the form of a voltage OLsp. The peak voltage memory 27 or rather its content may be erased after the time t1 whereby the memory 27 follows the signal voltage S until the next maximum M3, however, only if the signal voltage S exceeds the value which it had subsequently to the erasing of the memory 27 and the establishing of the signal path. Where an intermediate memory 28 is employed the evaluation may be accomplished during the two maxima M1 and M3.

If no intermediate memory 38 is used, the resulting wave form is shown in FIG. 3 also showing the signal voltage S and the upper load voltage OL and the lower load voltage UL. In the arrangement without the intermediate memory 28, the lowest value UL is first stored and the upper load OL follows the signal voltage S. During this time, a signal or voltage is applied to the upper input of the flip-flop 48 through the AND-gate 46, whereby a voltage appears at the output 54 of the flip-flop 48. The trigger stage 42 flips after the maximum M1 has been passed whereby a voltage is also applied to the conductor 53. Thus, the AND-gate 49 is actuated and triggers through the conductor 32 the timer 33. After a short intermediate storage time which corresponds, for example, to the time required by the computer 29, the switches 36 and 37 are closed for a time duration corresponding to $\Delta t$ whereby the difference values $\Delta A$ and $\Delta M$ are supplied to the evaluating means 38 and 39.

Instead of supplying the difference values $\Delta A$ and $\Delta M$ it is also possible to supply the actual amplitude or mean load values to the evaluation devices 38 and 39. After the completion of the time duration t1 the timer 33 supplies an erasing control signal to the memory 27 whereby the upper load value as well as the lower load value are erased. Thereafter at the end of the erasing signal both values assume the value of the signal voltage. As may be seen in FIG. 3, the lower load now follows the signal voltage whereas the upper load assumes the instantaneous value until the signal voltage exceeds such value. As soon as the minimum M2 is exceeded, the lower load value UL is stored and a voltage is applied to the lower input of the flip-flop 48 through the trigger stages 44 and 45 as well as through the AND-gate 47. Thus, the flip-flop 48 assumes its opposite position and supplies a voltage to the output 55.

Although the invention has been described with reference to a specific example embodiment, it is to be understood, that it is intended to cover all modifications and equivalents within the scope of the appended claims.

What is claimed is:

1. A peak value measuring and evaluating circuit arrangement for ascertaining the maxima and minima of an oscillation represented by an electrical signal comprising maximum and minimum value memory means having an input to which said electrical signal is applied, said memory means further having first and second outputs and an erasing input, first and second evaluating means, controlled switching and circuit means for connecting said first and second memory outputs to the respective first and second evaluating means, a timer connected to said controlled switching means and to said erasing input of said memory means, logic circuit means connected to said memory outputs and input to receive appropriate trigger signals, and means for connecting said logic circuit means to said timer, whereby said controlled switching means are closed after the occurrence of an actual extreme value for a first constant evaluating time ($\Delta t$) during a second constant storage time ($t1$), said first constant time being independent of the frequency of said oscillation, said second constant time ($t1$) corresponding at the most to one-half cycle duration of said oscillation, and whereby the content of said memory means is erased by said timer after the end of said constant storage time.

2. The circuit arrangement according to claim 1, further comprising a computer and comparator means, means for connecting said computer to the outputs of said memory means for producing actual signal values, means for connecting said computer to said comparator means, means for applying rated signal values to said comparator means, and means for connecting said comparator means to said controlled switching means, whereby said actual and rated signal values are compared by said comparator means for producing difference signals to be supplied to said evaluating means through said controlled switching means.

3. The circuit arrangement according to claim 1, wherein said logic circuit means comprise four trigger stages two each of which are combined as pairs arranged for responding to a maximum value and to a minimum value respectively, negating AND-gate means connected to said pairs of trigger stages, flip-flop means connected to said negating AND-gate means, and an AND-gate connected to one of said trigger stages and to said flip-flop means as well as to said timer for triggering the latter in response to a maximum or minimum value and in response to equality between said electrical signal and the stored signal values.

4. The circuit arrangement according to claim 1, comprising a further storage device connected in series with said memory means and also having an erasing input connected to said timer.

* * * * *

UNITED STATES PATENT OFFICE
CERTIFICATE OF CORRECTION

Patent No. 3,769,594  Dated October 30, 1973

Inventor(s) Carl-Martin Wawra, et al.

It is certified that error appears in the above-identified patent and that said Letters Patent are hereby corrected as shown below:

On the cover sheet [73] Assignee: "Carl Schenek Maschinenfabrik GmbH" should read -- Carl Schenck Maschinenfabrik GmbH --;

insert -- [30] Foreign Application Priority Data

March 22, 1972   Germany   P 22 13 736.6 --.

Signed and sealed this 9th day of April 1974.

(SEAL)
Attest:

EDWARD M. FLETCHER, JR.　　　　　　　C. MARSHALL DANN
Attesting Officer　　　　　　　　　　 Commissioner of Patents